United States Patent
Ikuji et al.

(10) Patent No.: US 7,169,849 B2
(45) Date of Patent: Jan. 30, 2007

(54) PROCESS FOR PRODUCTION OF THERMOPLATIC ELASTOMER COMPOSITION

(75) Inventors: Masaki Ikuji, Ibaraki (JP); Koichi Wada, Ibaraki (JP); Masanari Uno, Ibaraki (JP)

(73) Assignee: Kuraray Co., Ltd., Kurashiki (JP)

( * ) Notice: Subject to any disclaimer, the term of this patent is extended or adjusted under 35 U.S.C. 154(b) by 147 days.

(21) Appl. No.: 10/480,991

(22) PCT Filed: Jun. 13, 2002

(86) PCT No.: PCT/JP02/05910

§ 371 (c)(1),
(2), (4) Date: Dec. 17, 2003

(87) PCT Pub. No.: WO02/102895

PCT Pub. Date: Dec. 27, 2002

(65) Prior Publication Data

US 2004/0176524 A1    Sep. 9, 2004

(30) Foreign Application Priority Data

Jun. 18, 2001 (JP) ............................. 2001-183212
Jun. 18, 2001 (JP) ............................. 2001-183221

(51) Int. Cl.
*C08L 53/02* (2006.01)
(52) U.S. Cl. ..................... 525/88; 525/89; 525/91; 525/191; 525/192; 525/194; 525/197; 525/198; 525/263; 525/236; 525/240; 524/274
(58) Field of Classification Search .............. 525/89, 525/88, 91, 191, 192, 194, 197, 198, 263, 525/236, 240; 524/274
See application file for complete search history.

(56) References Cited

U.S. PATENT DOCUMENTS 5,726,239 A * 3/1998 Maes et al. ................ 524/505

6,214,934 B1    4/2001 Moriya et al.
6,433,062 B1 *  8/2002 Tasaka et al. ............... 524/484

FOREIGN PATENT DOCUMENTS

| EP | 0 810 262 A1 | 12/1997 |
| EP | 0 902 051 A1 | 3/1999 |
| EP | 0 994 153 A1 | 4/2000 |
| JP | 59-6236 | 1/1984 |
| JP | 8-225713 | 9/1996 |
| JP | 9-151295 | 6/1997 |
| JP | 10-251480 | 9/1998 |

\* cited by examiner

*Primary Examiner*—James J. Seidleck
*Assistant Examiner*—Olga Asinovsky
(74) *Attorney, Agent, or Firm*—Oblon, Spivak, McClelland, Maier & Neustadt, P.C.

(57) ABSTRACT

A process for production of a thermoplastic elastomer composition by melt-kneading a mixture in one step to thereby conduct dynamic crosslinking, wherein the mixture comprises a hydrogenated block copolymer ($a_1$) which is prepared by hydrogenating a block copolymer comprising a vinyl aromatic polymer block ($A_1$) and a conjugated diene polymer block ($B_1$) and has number-average molecular weight of 200000 or above and, if necessary, a non-hydrogenated block copolymer ($a_2$) comprising a vinyl aromatic polymer block ($A_2$) and a conjugated diene polymer block ($B_2$), and contains a non-aromatic rubber softening agent (b), a peroxide-crosslinkable olefin resin (c) having a density of 0.94 g/cm$^3$ or above, a peroxide-decomposable olefin resin (d), an organic peroxide (e), and a crosslinking aid (f), the amount of (b) being 50 to 250 parts by mass per 100 parts by mass of the sum of ($a_1$) +($a_2$), the amount of (c) being 2.5 to 50 parts by mass per 100 parts by mass of (a); and the amount of (d) being 0.5 to 10 times that of (c) by mass.

8 Claims, No Drawings

PROCESS FOR PRODUCTION OF THERMOPLATIC ELASTOMER COMPOSITION

TECHNICAL FIELD

The present invention relates to a process for producing a thermoplastic elastomer composition and a thermoplastic elastomer composition which is obtained by this process. More particularly, the present invention relates to a process for producing, by means of a simple melt kneading process, a thermoplastic elastomer composition which is superior in terms of pliability and superior in terms of rubber elasticity, especially rubber elasticity at high temperatures, which shows an extremely small compression set, and which is also superior in terms of high-temperature creep performance, mechanical strength, oil resistance, solvent resistance, heat resistance, weather resistance and surface characteristics of the molded articles obtained, and a thermoplastic elastomer composition that is obtained by this process. As a result of its superior characteristics, the thermoplastic elastomer composition obtained by the process of the present invention can be effectively used as a material for various types of molded articles and the like.

BACKGROUND ART

Thermoplastic elastomers do not require a vulcanization step, and can be molded in the same manner as thermoplastic resins. In recent years, therefore, such elastomers have been used in a broad range of fields such as automotive parts, household electrical appliance parts, electrical wire coverings, medical parts, miscellaneous footwear, toys, sporting goods, products for daily use and the like.

Among thermoplastic elastomers, styrene type thermoplastic elastomers in particular, as represented by polystyrene-polybutadiene-polystyrene block copolymers (SBS), polystyrene-polyisoprene-polystyrene block copolymers (SIS) and hydrogenation products of such copolymers, are widely used because of their low cost and superior resistance to hydrolysis.

In the case of hydrogenation products of block copolymers which have vinyl aromatic compound polymer blocks and conjugate diene compound polymer blocks, as represented by hydrogenation products of polystyrene-polybutadiene -polystyrene block copolymers and hydrogenation products of polystyrene-polyisoprene-polystyrene block copolymers, the insufficient heat resistance and weather resistance seen in block copolymers that have vinyl aromatic compound polymer blocks and conjugate diene compound polymer blocks is improved by hydrogenation; however, such hydrogenation products are inferior in terms of rubber elasticity at high temperatures, and show a large compression set at high temperatures.

In order to improve the above-mentioned point, a process is described in Japanese Patent Application Laid-Open No.59-6236 in which an elastomer composition is produced using the respective components of 100 parts by weight of ($\alpha$-1) a hydrogenation product of a block copolymer which has two or more vinyl aromatic compound polymer blocks and one or more conjugate diene compound polymer blocks, 20 to 150 parts by weight of ($\alpha$-2) a peroxide-crosslinkable olefin copolymer rubber, 0 to 50 parts by weight of ($\alpha$-3) a peroxide non-crosslinking type hydrocarbon rubber, 80 to 300 parts by weight of ($\alpha$-4) a non-aromatic rubber softening agent, 30 to 400 parts by weight of ($\alpha$-5) a peroxide-decomposable olefin resin, and 0 to 900 parts by weight of ($\alpha$-6) an inorganic filler, by first heat-treating the total amount of at least component ($\alpha$-2) among the respective components (excluding component ($\alpha$-1)) in the presence of an organic peroxide so that dynamic crosslinking is caused to take place, and then mixing this dynamic crosslinking product, component ($\alpha$-1) and the remaining components. Furthermore, it is indicated in this Japanese Patent Application that in cases where the above-mentioned multi-stage partial crosslinking and mixing step is not used, the elastomer composition shows a great drop in mechanical strength.

Furthermore, in Japanese Patent Application Laid-Open No. 8-225713, a process for producing a thermoplastic elastomer resin composition is described which is characterized by the fact that in a process for producing a thermoplastic elastomer resin composition containing 100 parts by weight of ($\beta$-1) a block copolymer which has two or more vinyl aromatic compound polymer blocks and one or more conjugate diene compound polymer blocks, and/or a hydrogenation product of the same, 40 to 300 parts by weight of ($\beta$-2) a non-aromatic rubber softening agent, 1.0 to 100 parts by weight of ($\beta$-3) a peroxide-crosslinkable olefin resin and/or a copolymer rubber containing the same, and 10 to 150 parts by weight of ($\beta$-4) a peroxide-decomposable olefin resin and/or a copolymer containing the same, component ($\beta$-1), component ($\beta$-2), at least a portion of component ($\beta$-3) and a portion of component ($\beta$-4) are crosslinked by being subjected to a heat treatment in the presence of an organic peroxide, and this product of crosslinking is then mixed with the remainder of component ($\beta$-4) or the remainders of component ($\beta$-3) and component ($\beta$-4). Furthermore, in this Japanese Patent Application, it is indicated that the composition that is dynamically crosslinked in the presence of an organic peroxide and the component ($\beta$-4) that is mixed afterward are mutually dissolved and micro-dispersed in the composition, so that process-ability, fluidity, mechanical strength and the like of the thermoplastic elastomer resin composition that is obtained are improved.

However, in both of the processes described in the two Japanese Patent Applications above-mentioned, it is impossible to cause dynamic crosslinking of the components at one time in the final mixture proportions; it is necessary to use a process in which some of the constituent components are dynamically crosslinked, after which the remaining components are mixed. Accordingly, in both cases, the production process of the thermoplastic elastomer resin composition is extremely complicated, and the resulting composition is still insufficient in terms of rubber elasticity at high temperatures.

An object of the present invention is to provide a thermoplastic elastomer composition which is formed by dynamically crosslinking a mixture containing a hydrogenation product of a block copolymer which has vinyl aromatic compound polymer blocks and conjugate diene compound polymer blocks, a non-aromatic rubber softening agent, a peroxide-crosslinkable olefin resin and a peroxide-decomposable olefin resin in the presence of an organic peroxide, wherein this composition is a dynamically crosslinked thermoplastic elastomer composition which is superior on terms of various characteristics, and which can be obtained by an arbitrary heating and kneading step that includes a single-stage, especially a single-stage heating and kneading step, without an absolute need for a multi-stage partial crosslinking and mixing step such as that used in the prior art described in the above-mentioned patents. In particular, it is an object of the present invention to provide a process for producing a dynamically crosslinked thermoplastic elastomer composition which is superior in terms of pliability and superior in terms of rubber elasticity, especially rubber elasticity at high temperatures, which shows an extremely small compression set, and which makes it possible to produce molded articles that are superior in terms of high-temperature creep performance, mechanical strength, oil resistance, solvent resistance, heat resistance, weather resistance, surface characteristics and the like.

Furthermore, it is an object of the present invention to provide a thermoplastic elastomer composition which has the above-mentioned superior characteristics.

DISCLOSURE OF THE INVENTION

The present inventors conducted research in order to achieve the above-mentioned objects. As a result, the inventors made the following discovery: specifically, in the production of a thermoplastic elastomer composition by dynamically crosslinking a mixture containing a hydrogenation product of a block copolymer which contains vinyl aromatic compound polymer blocks and conjugate diene compound polymer blocks, a non-aromatic rubber softening agent, a peroxide-crosslinkable olefin resin and a peroxide-decomposable olefin resin in the presence of an organic peroxide, a dynamically crosslinked thermoplastic elastomer composition which has various favorable characteristics can be obtained by a single-stage heating and kneading step without any need for a multi-stage dynamic crosslinking and mixing such as that used in the prior art described in the two Japanese Patent Applications above-mentioned, if a hydrogenate block copolymer which has a molecular weight in a specified range is used as the hydrogenation product of a block copolymer which has vinyl aromatic compound polymer blocks and conjugate diene compound polymer blocks or a specified amount or less of a non-hydrogenated block copolymer which has vinyl aromatic compound polymer blocks and conjugate diene compound polymer blocks (that have not been hydrogenated) is used in combination with this hydrogenated block copolymer that has a molecular weight in a specified range, and a resin which has a specified density is used as the peroxide-crosslinkable olefin resin, and the mixture amounts of the hydrogenated block copolymer, non-hydrogenated block copolymer, non-aromatic rubber softening agent, peroxide-crosslinkable olefin resin and peroxide-decomposable olefin resin are set in specified ranges.

In particular, the present inventors discovered that the above-mentioned dynamically crosslinked thermoplastic elastomer composition and molded articles obtained from this composition are superior in terms of pliability and superior in terms of rubber elasticity, especially rubber elasticity at high temperatures, that this composition and molded articles show an extremely small compression set even when compressed for a long period of time at high temperatures, that the composition and molded articles are superior in terms of high-temperature creep performance, mechanical strength, oil resistance, solvent resistance, heat resistance, weather resistance and the like, and that there is no surface roughness or bleed-out of the softening agent to the surface.

Furthermore, the present inventors discovered that the above-mentioned dynamically crosslinked thermoplastic elastomer composition with various favorable characteristics can be obtained even by an arbitrary heating and kneading step that includes a single-stage in cases where a specified amount or less of a non-hydrogenated block copolymer that has vinyl aromatic compound polymer blocks and conjugate diene compound polymer blocks (that are not hydrogenated) is used in combination with the above-mentioned hydrogenated block copolymer that has a specified molecular weight, a resin which has a specified density is used as the above-mentioned peroxide-crosslinkable olefin resin, and the mixture proportions of the above-mentioned hydrogenated block copolymer, non-hydrogenated block copolymer, non-aromatic rubber softening agent, peroxide-crosslinkable olefin resin and peroxide-decomposable olefin resin are set in specified ranges. The present invention was perfected on the basis of these findings.

Specifically, the present invention is:

(1) a process for producing a thermoplastic elastomer composition, comprising, in a single-stage step, melting and kneading a mixture under heating to be dynamically crosslinked, wherein said mixture contains:

(i) a hydrogenated block copolymer ($a_1$) with a number average molecular weight of 200,000 or above which is obtained by hydrogenating a block copolymer that has at least one polymer block $A_1$ comprising mainly a vinyl aromatic compound and at least one polymer block $B_1$ comprising mainly a conjugate diene compound, and a non-hydrogenated block copolymer ($a_2$) which has at least one polymer block $A_2$ comprising mainly a vinyl aromatic compound and at least one polymer block $B_2$ comprising mainly a conjugate diene compound, at a mass ratio of the hydrogenated block copolymer ($a_1$):the non-hydrogenated block copolymer ($a_2$)=85:15 to 100:0;

(ii) a non-aromatic rubber softening agent (b) at a ratio of 50 to 250 mass parts per 100 mass parts of the total of the hydrogenated block copolymer ($a_1$) and the non-hydrogenated block copolymer ($a_2$);

(iii) a peroxide-crosslinkable olefin resin (c) with a density of 0.94 g/cm$^3$ or above at a ratio of 2.5 to 50 mass parts per 100 mass parts of the total of the hydrogenated block copolymer ($a_1$) and non-hydrogenated block copolymer ($a_2$);

(iv) a peroxide-decomposable olefin resin (d) at the rate of 0.5 to 10 times by mass the mixture amount of the peroxide-crosslinkable olefin resin (c); and (v) an organic peroxide (e) and a crosslinking aid (f).

Furthermore, the present invention is:

(2) the process for producing thermoplastic elastomer composition according to the above-mentioned (1), wherein the content ratio of the hydrogenated block copolymer ($a_1$):non-hydrogenated block copolymer ($a_2$) is 85:15 to 99:1.

Furthermore, the present invention is:

(3) the process for producing thermoplastic elastomer composition according to the above-mentioned (1), wherein the content ratio of the hydrogenated block copolymer ($a_1$):non-hydrogenated block copolymer ($a_2$) is 100:0.

Furthermore, the present invention is:

(4) the process for producing thermoplastic elastomer composition according to the above-mentioned (1), wherein the polymer block $B_1$ comprising mainly a conjugate diene compound in the above-mentioned hydrogenated block copolymer ($a_1$) is a polymer block comprising 1,3-butadiene and isoprene;

(5) the process for producing thermoplastic elastomer composition according to the above-mentioned (1), wherein amount of the organic peroxide (e) that is added is 0.3 to 1.5 mass parts per 100 mass parts of the total of the above-mentioned ($a_1$), ($a_2$), (b), (c) and (d), and the amount of the crosslinking aid (f) that is added is 0.5 to 3.0 times by mass the mixture amount of the organic peroxide (e); and (6) the process for producing thermoplastic elastomer composition according to the above-mentioned (1), wherein the kinematic viscosity ($B_v$) (mm²/s) of the non-aromatic rubber softening agent (b) at 40° C. satisfies the following formula ①:

$$B_v(\text{mm}^2/\text{s}) \geq 3 \times 10^7 / Mna_1 \quad ①$$

wherein the above formula, $B_v$ indicates the kinematic viscosity of the non-aromatic rubber softening agent (b) at 40° C., and $Mna_1$ indicates the number average molecular weight of the hydrogenated block copolymer ($a_1$).

Furthermore, the present invention is:

(7) a thermoplastic elastomer composition which is obtained by, in a single-stage step, melting and kneading a mixture under heating to be dynamically crosslinked, wherein said mixture contains:

(i) a hydrogenated block copolymer ($a_1$) with a number average molecular weight of 200,000 or above which is obtained by hydrogenating a block copolymer that has at least one polymer block $A_1$ comprising mainly a vinyl aromatic compound and at least one polymer block $B_1$ comprising mainly a conjugate diene compound, and a non-hydrogenated block copolymer ($a_2$) which has at least one polymer block $A_2$ comprising mainly a vinyl aromatic compound and at least one polymer block $B_2$ comprising mainly a conjugate diene compound, at a mass ratio of the hydrogenated block copolymer ($a_1$):the non-hydrogenated block copolymer ($a_2$)=85:15 to 100:0;

(ii) a non-aromatic rubber softening agent (b) at a ratio of 50 to 250 mass parts per 100 mass parts of the total of the hydrogenated block copolymer ($a_1$) and the non-hydrogenated block copolymer ($a_2$);

(iii) a peroxide-crosslinkable olefin resin (c) with a density of 0.94 g/cm³ or above at a ratio of 2.5 to 50 mass parts per 100 mass parts of the total of the hydrogenated block copolymer ($a_1$) and non-hydrogenated block copolymer ($a_2$);

(iv) a peroxide-decomposable olefin resin (d) at the rate of 0.5 to 10 times by mass the mixture amount of the peroxide-crosslinkable olefin resin (c); and (v) an organic peroxide (e) and a crosslinking aid (f).

Furthermore, the present invention is:

(8) a thermoplastic elastomer composition, which is obtained by, in an arbitrary step that contains a single-stage step, melting and kneading a mixture under heating to be dynamically crosslinked, wherein said mixture contains:

(i) a hydrogenated block copolymer ($a_1$) with a number average molecular weight of 200,000 or above which is obtained by hydrogenating a block copolymer that has at least one polymer block $A_1$ comprising mainly a vinyl aromatic compound and at least one polymer block $B_1$ comprising mainly a conjugate diene compound, and a non-hydrogenated block copolymer ($a_2$) which has at least one polymer block $A_2$ comprising mainly a vinyl aromatic compound and at least one polymer block $B_2$ comprising mainly a conjugate diene compound, at a mass ratio of the hydrogenated block copolymer ($a_1$):the non-hydrogenated block copolymer ($a_2$)=85:15 to 99:1;

(ii) a non-aromatic rubber softening agent (b) at a ratio of 50 to 250 mass parts per 100 mass parts of the total of the hydrogenated block copolymer ($a_1$) and the non-hydrogenated block copolymer ($a_2$);

(iii) a peroxide-crosslinkable olefin resin (c) with a density of 0.94 g/cm³ or above at a ratio of 2.5 to 50 mass parts per 100 mass parts of the total of the hydrogenated block copolymer ($a_1$) and non-hydrogenated block copolymer ($a_2$);

(iv) a peroxide-decomposable olefin resin (d) at the rate of 0.5 to 10 times by mass the mixture amount of the peroxide-crosslinkable olefin resin (c); and (v) an organic peroxide (e) and a crosslinking aid (f).

BEST MODE FOR CARRYING OUT THE INVENTION

The present invention will be described in detail below.

The hydrogenated block copolymer ($a_1$) used in the present invention is a hydrogenated block copolymer which is formed by hydrogenating a block copolymer that has at least one polymer block $A_1$ comprising mainly a vinyl aromatic compound and at least one polymer block $B_1$, comprising mainly a conjugate diene compound.

Examples of vinyl aromatic compounds that may constitute the polymer block $A_1$ in the hydrogenated block copolymer ($a_1$) include styrene, α-methylstyrene, o-methylstyrene, m-methylstyrene, p-methylstyrene, p-t-butylstyrene, 2,4-dimethylstyrene, 2,4,6-trimethylstyrene, monofluorostyrene, difluorostyrene, monochlorostyrene, dichlorostyrene, vinylnaphthalene, vinylanthracene and the like. The polymer block $A_1$ can be formed from one or more of these vinyl aromatic compounds. Among these compounds, it is desirable that the polymer block $A_1$ is formed from styrene.

In some cases, the polymer block $A_1$ may contain small amounts (preferably amounts equal to 10 mass % or less of the polymer block $A_1$) of one or more structural units originating in unsaturated monomers other than vinyl aromatic compounds (e. g., 1-butene, pentene, hexene, 1,3-butadiene, isoprene, methylvinyl ether, methyl methacrylate, vinyl acetate or the like) as long there is no interference with the object and effect of the present invention.

Furthermore, examples of conjugate diene compounds that may constitute the polymer block $B_1$ in the hydrogenated block copolymer ($a_1$) include 1,3-butadiene, isoprene, 2,3-dimethyl-1,3-butadiene, 1,3-pentadiene, 1,3-hexadiene and the like. The polymer block $B_1$ can be formed from one or more of these conjugate diene compounds. Among these compounds, it is desirable that the polymer block $B_1$ is formed from either 1,3-butadiene or isoprene, or from both of these compounds. From the standpoint of reduced stickiness of the surface of the thermoplastic elastomer composition that is obtained, it is desirable that this polymer block is formed from both 1,3-butadiene and isoprene.

There are no particular restrictions on the bonding configuration of the conjugate diene compounds in the polymer block $B_1$. For example, in the case of 1,3-butadiene, 1,2-bonding and/or 1,4-bonding may be in existence, and in the case of isoprene, 1,2-bonding, 3,4-bonding, and/or 1,4-bonding may be in existence. Any of these bonding configurations may be in existence. In particular, in cases where the polymer block $B_1$ is formed from 1,3-butadiene, it is desirable that the proportion of 1,2-bonding is 20 to 70 mol %, and that the proportion of 1,4-bonding is 30 to 80 mol %. Furthermore, in cases where the polymer block $B_1$ is formed from isoprene, or from isoprene and 1,3-butadiene, it is desirable that the total of 3,4-bonding and 1,2-bonding is 5 to 70 mol %.

Furthermore, in cases where the polymer block $B_1$ is formed from two or more conjugate diene compounds (e. g., 1,3-butadiene and isoprene), the bonding configuration of these compounds may be completely alternating, random, tapered, partially block-formed or a combination of two or more of these bonding configurations.

In the polymer block $B_1$, it is necessary that some or all of the carbon-carbon double bonds based on the conjugate diene compounds are hydrogenated. There are no particular restrictions on the hydrogenation rate; however, from the standpoints of heat resistance and weather resistance, it is desirable that 85 mol % or more of the carbon-carbon double bonds based on the conjugate diene compounds are hydrogenated, and it is even more desirable that 90 mol % or more of these double bonds are hydrogenated.

In regard to the hydrogenation rate, the content of carbon-carbon double bonds based on the conjugate diene compounds in the polymer block $B_1$ is measured before and after hydrogenation by means of iodine value measurements, an infrared spectrometer, the $^1$H-NMR spectrum or the like, and the hydrogenation rate can be determined from these measured values.

In some cases, the polymer block $B_1$ may contain small amounts (preferably amounts equal to 10 mass % or less of the polymer block $B_1$) of one or more structural units originating in unsaturated monomers (e. g., 1-butene, 1-pentene, 1-hexene, methyl vinyl ether, styrene, methyl methacrylate, vinyl acetate or the like) other than conjugate diene compounds as long as there is no interference with the object and effect of the present invention.

As long as the hydrogenated block copolymer ($a_1$) is a hydrogenation product of a block copolymer in which at least one polymer block $A_1$ and at least one polymer block $B_1$ are bonded, there are no restrictions on the bonding configuration of these polymer blocks; this bonding configuration may be a linear, branched or radial configuration, or a bonding configuration in which two or more of these configurations are combined. Among these configurations, it is desirable that the bonding configuration of the polymer block(s) $A_1$ and polymer block(s) $B_1$ are a linear configuration; a hydrogenation product of a di-block copolymer $A_1$—$B_1$, a hydrogenation product of a tri-block copolymer $A_1$—$B_1$—$A_1$, a hydrogenation product of a tetra α-block copolymer $A_1$—$B_1$—$A_1$—$B_1$, a hydrogenation product of a pentα-block copolymer $A_1$—$B_1$—$A_1$—$B_1$—$A_1$, and the like (where the polymer block(s) $A_1$ are expressed as $A_1$, and the polymer block(s) $B_1$ are expressed as $B_1$) may be cited as examples. Among these, a hydrogenation product of a di-block copolymer $A_1$—$B_1$, and/or a hydrogenation product of a tri-block copolymer $A_1$—$B_1$—$A_1$ are desirable for use from the standpoints of ease of manufacture of the block copolymer, pliability and the like.

It is desirable from the standpoints of the mechanical strength, pliability and the like of the thermoplastic elastomer composition that the content of structural units originating in vinyl aromatic compounds in the hydrogenated block copolymer ($a_1$) be in the range of 10 to 65 mass %, and a content in the range of 15 to 35 mass % is even more desirable. Furthermore, the content of structural units originating in vinyl aromatic compounds in the block copolymers, including the hydrogenated block copolymer ($a_1$), can be determined from the $^1$H-NMR spectrum or the like.

It is necessary that the number average molecular weight of the hydrogenated block copolymer ($a_1$) after hydrogenation is 200,000 or above, and it is desirable that this number average molecular weight is 250,000 or above. If the number average molecular weight of the hydrogenated block copolymer ($a_1$) is less than 200,000, the rubber elasticity of the thermoplastic elastomer composition at high temperatures drops. There are no particular restrictions on the upper limit of the number average molecular weight of the hydrogenated block copolymer ($a_1$); however, it is desirable from the standpoint of the molding process-ability of the thermoplastic elastomer composition that this number average molecular weight is 500,000 or less.

Furthermore, the term "number average molecular weight" used in the present specification refers to the molecular weight calculated in terms of polystyrene as determined by gel permeation chromatography (GPC) measurements.

In some cases, the hydrogenated block copolymer ($a_1$) may have one or more types of functional groups such as carboxyl group, hydroxyl group, acid anhydride group, amino group, epoxy group or the like in the molecular chains and/or on the molecular terminals, as long as this does not adversely affect the purpose or the present invention.

In the present invention, furthermore, a non-hydrogenated block copolymer ($a_2$) which is not hydrogenated, and which has at least one polymer block $A_2$ that comprises mainly a vinyl aromatic compound and at least one polymer block $B_2$ that comprises mainly a conjugate diene compound, may be used in combination with the above-mentioned hydrogenated block copolymer ($a_1$). If the non-hydrogenated block copolymer ($a_2$) which has carbon-carbon double bonds originating in a conjugate diene compound in the molecule is used in combination with the hydrogenated block copolymer ($a_1$), the crosslinking reaction of the thermoplastic elastomer composition is promoted, so that the rubber elasticity at high temperatures is higher, and the compression set at high temperatures can be reduced.

Examples of vinyl aromatic compounds that may constitute the polymer block $A_2$ in the hydrogenated block copolymer ($a_2$) include styrene, α-methylstyrene, o-methylstyrene, m-methylstyrene, p-methylstyrene, p-t-butylstyrene, 2,4-dimethylstyrene, 2,4,6-trimethylstyrene, monofluorostyrene, difluorostyrene, monochlorostyrene, dichlorostyrene, vinylnaphtalene, vinylanthracene and the like. The polymer block $A_2$ can be formed from one or more of these vinyl aromatic compounds. Among these compounds, it is desirable that the polymer block $A_2$ is formed from styrene.

In some cases, the polymer block $A_2$ in the non-hydrogenated block copolymer ($a_2$) may contain small amounts (preferably amounts equal to 10 mass % or less of the polymer block $A_2$) of one or more structural units originating in unsaturated monomers other than vinyl aromatic compounds (e. g., 1-butene, pentene, hexene, 1,3-butadiene, isoprene, methyl vinyl ether, methyl methacrylate, vinyl acetate or the like) as long there is no interference with the object and effect of the present invention.

Furthermore, examples of conjugate diene compounds that may constitute the polymer block $B_2$ in the non-hydrogenated block copolymer ($a_2$) include 1,3-butadiene, isoprene, 2,3-dimethyl-1,3-butadiene, 1,3-pentadiene, 1,3-hexadiene and the like. The polymer block $B_2$ can be formed from one or more of these conjugate diene compounds. Among these compounds, it is desirable that the polymer block $B_2$ is formed from either 1,3-butadiene or isoprene, or from both of these compounds.

There are no particular restrictions on the bonding configuration of the conjugate diene compounds in the polymer block $B_2$. For example, in the case of 1,3-butadiene, 1,2-bonding and/or 1,4-bonding may be in existence, and in the case of isoprene, 1,2-bonding, 3,4-bonding and/or 1,4-bonding may be in existence. Any of these bonding configurations may be in existence. In particular, in cases where the polymer block $B_2$ is formed from 1,3-butadiene, it is desirable that the proportion of 1,2-bonding is 20 to 70 mol %, and that the proportion of 1,4-bonding is 30 to 80 mol %. Furthermore, in cases where the polymer block $B_2$ is formed from isoprene, or from isoprene and 1,3-butadiene, it is desirable that the total of 3,4-bonding and 1,2-bonding is 5 to 70 mol %.

Furthermore, in cases where the polymer block $B_2$ is formed from two or more conjugate diene compounds (e. g., 1,3-butadiene and isoprene), the bonding configuration of these compounds may be completely alternating, random, tapered, partially block-formed or a combination of two of more of these bonding configurations.

In some cases, the polymer block $B_2$ may contain small amounts (preferably amounts equal to 10 mass % or less of the polymer block $B_2$) of one or more structural units originating in unsaturated monomers other than conjugated diene compounds (e. g., 1-butene, 1-pentene, 1-hexene, methyl vinyl ether, styrene, methyl methacrylate, vinyl acetate or the like) as long as there is no interference with the object and effect of the present invention.

As long as the non-hydrogenated block copolymer $(a_2)$ is a block copolymer in which at least one polymer block $A_2$ and at least one polymer block $B_2$ are bonded, there are no restrictions on the bonding configuration of these polymer blocks; this bonding configuration may be a linear, branched or radial configuration, or a bonding configuration in which two or more of these configurations are combined. Among these configurations, it is desirable that the bonding configuration of the polymer block(s) $A_2$ and polymer block(s) $B_2$ is a linear configuration; a di-block copolymer $A_2$—$B_2$, a tri-block copolymer $A_2$—$B_2$—$A_2$, a tetra-block copolymer $A_2$—$B_2$—$A_2$—$B_2$, a penta-block copolymer $A_2$—$B_2$—$A_2$—$B_2$—$A_2$ and the like (where the polymer block(s) $A_2$ are expressed as $A_2$, and the polymer block(s) $B_2$ are expressed as $B_2$) may be cited as examples. Among these, a di-block copolymer $A_2$—$B_2$ and/or a tri-block copolymer $A_2$—$B_2$—$A_2$ are desirable for use from the standpoints of ease of production of the block copolymer, pliability and the like.

From the standpoints of the mechanical strength, pliability, rubber elasticity and the like of the thermoplastic elastomer composition, the content of structural units originating in vinyl aromatic compounds in the hydrogenated block copolymer $(a_2)$ is preferably in the range of 10 to 65 mass %, more preferably in the range of 15 to 35 mass %.

The number average molecular weight of the non-hydrogenated block copolymer $(a_2)$ is preferably 50,000 to 300,000, more preferably 100,000 to 200,000. If the number average molecular weight of the non-hydrogenated block copolymer $(a_2)$ is less than 50,000, the rubber elasticity of the thermoplastic elastomer composition at high temperatures tends to drop, and bleed-out of the non-aromatic rubber softening agent (b) tends to occur. On the other hand, if the number average molecular weight of the non-hydrogenated block copolymer $(a_2)$ exceeds 300,000, the thermoplastic elastomer composition lacks fluidity, and the moldability of the composition deteriorates.

In some cases, the non-hydrogenated block copolymer $(a_2)$ may have one or more types of functional groups such as carboxyl group, hydroxyl group, acid anhydride group, amino group, epoxy group or the like in the molecular chains and/or on the molecular terminals, as long as this does not adversely affect the purpose of the present invention.

There are no particular restrictions on the method used to produce the hydrogenated block copolymer $(a_1)$ and non-hydrogenated block copolymer $(a_2)$. For example, these block copolymers may be produced by any known methods, e. g., ionic polymerization methods such as anionic polymerization, cationic polymerization or the like, or by single-site polymerization methods, radical polymerization methods or the like. In cases where an anionic polymerization method is used, for example, the block copolymers can be manufactured by methods such as successive polymerization, coupling or the like of the vinyl aromatic compounds and conjugate diene compounds in an organic solvent that is inert with respect to the polymerization reaction, such as n-hexane, cyclohexane or the like, using an alkyllithium compound or the like as a polymerization initiator. Then, in the case of the hydrogenated block copolymer $(a_1)$, the block copolymer that is obtained as described above is hydrogenated using a known method in the presence of a hydrogenation catalyst in an inert organic solvent. Furthermore, in the case of the non-hydrogenated block copolymer $(a_2)$, the block copolymer obtained as described above is used without being hydrogenated.

In the present invention, the hydrogenated block copolymer $(a_1)$ and non-hydrogenated block copolymer $(a_2)$ are used at a mass ratio of $(a_1):(a_2)=85:15$ to $100:0$. If the proportion of the hydrogenated block copolymer $(a_1)$ to the total mass of the hydrogenated block copolymer $(a_1)$ and non-hydrogenated block copolymer $(a_2)$ is less than 85 mass % (i. e., if the proportion of the non-hydrogenated block copolymer $(a_2)$ exceeds 15 mass %), the heat resistance and weather resistance of the thermoplastic elastomer composition are inferior.

In order to ensure thorough crosslinking, so that the rubber elasticity of the thermoplastic elastomer composition and molded articles consisting of this composition at high temperatures is increased, and the compression set is reduced, it is desirable that the non-hydrogenated block copolymer $(a_2)$ is used at a ratio of 1 to 15 mass %, preferably 5 to 10 mass %, relative to the total mass of the hydrogenated block copolymer $(a_1)$ and non-hydrogenated block copolymer $(a_2)$.

Any non-aromatic rubber softening agent that has been universally known in the past may be used as the non-aromatic rubber softening agent (b) that is used in the present invention. Among these agents, non-aromatic mineral oil, or oil-formed or low molecular weight synthetic softening agents, are suitable for use. In regard to the non-aromatic rubber softening agent (b), a single type of softening agent may be used, or two or more types of softening agents may be used in combination.

Generally, mineral oil type rubber softening agents called process oil or extender oil, which are used to soften rubbers, increase the volume and improve the process-ability or the like, are mixtures in which three components, i. e., aromatic rings, naphthene rings and paraffin chains, are combined. Agents in which carbon atoms of paraffin chains constitute 50% or more of the total number of carbon atoms are called paraffin type gents, agents in which carbon atoms of naphthene rings constitute 30 to 45% of the carbon atoms are called naphthene type agents, and agents in which aromatic carbon atoms constitute more than 30% of the carbon atoms are called aromatic type agents.

In the present invention, among the above-mentioned process oil, paraffin type process oil or naphthene type process oil can be used. In addition, white oil, mineral oil, low molecular weight copolymers (oligomers) of ethylene and α-olefins, paraffin wax, liquid paraffin and the like may also be used. In particular, paraffin type process oils and/or naphthene type process oil are desirable for use as the non-aromatic rubber softening agent (b) in the present invention.

Furthermore, if an aromatic rubber softening agent used as an aromatic type process oil or the like is use instead of the non-aromatic rubber softening agent (b), the polymer blocks comprising vinyl aromatic compounds in the hydrogenated block copolymer $(a_1)$ and non-hydrogenated block copolymer $(a_2)$ are attacked, so that the physical properties of the thermoplastic elastomer composition, especially the mechanical strength and rubber elasticity, cannot be improved.

In the present invention, furthermore, it is desirable from the standpoint of improving the heat resistance of the thermoplastic elastomer composition that is obtained, and especially from the standpoint of maintaining the rubber elasticity at high temperatures, that the kinematic viscosity ($B_v$) (mm²/s) of the non-aromatic rubber softening agent (b) at 40° C. satisfy the following formula ①

$$B_v(\text{mm}^2/\text{s}) \geq 3 \times 10^7 / Mna_1 \qquad ①$$

wherein the above formula, $B_v$ indicates the kinematic viscosity of the non-aromatic rubber softening agent (b) at 40° C., and $Mna_1$ indicates the number average molecular weight of the hydrogenated block copolymer ($a_1$).

Furthermore, the term "kinematic viscosity (mm²/s) of the non-aromatic rubber softening agent (b) at 40° C." as used in the present specification refers to the commercial value obtained by dividing the viscosity measured at a temperature of 40° C. using a B type viscometer by the density of the non-aromatic rubber softening agent (b) at 40° C.

It is necessary that the amount of the non-aromatic rubber softening agent (b) that is mixed with the composition is 50 to 250 mass parts per 100 mass parts of the total of the hydrogenated block copolymer ($a_1$) and non-hydrogenated block copolymer ($a_2$), and it is desirable that this amount is 80 to 200 mass parts. If the mixture amount of the non-aromatic rubber softening agent (b) is less than the above-mentioned 50 mass parts, the pliability of the thermoplastic elastomer composition is inferior, and the molding processability deteriorate; on the other hand, if this amount exceeds 250 mass parts, the mechanical strength of molded articles obtained from the thermoplastic elastomer composition is insufficient, and bleed-out of the non-aromatic rubber softening agent (b) occurs.

The peroxide-crosslinkable olefin resin (c) used in the present invention refers to an olefin resin that molecular weight increases as a result of crosslinking when heated in the presence of a peroxide. Examples of such a peroxide-crosslinkable olefin resin (c) include polyethylene and copolymer of ethylene with small amounts of propylene, 1-hexene or 1-octene. One or more such resins may be used. Among these resins, polyethylene is desirable for use from the standpoints of realizing rubber elasticity at high temperatures.

It is necessary that the density of the peroxide-crosslinkable olefin resin (c) used in the present invention is 0.94 g/cm³ or above, and it is desirable that this density is 0.95 g/cm³ or above. If the density of the peroxide-crosslinkable olefin resin (c) is less than 0.94 g/cm³, the rubber elasticity of the thermoplastic elastomer composition at high temperatures, especially at high temperatures exceeding 100° C., is insufficient.

Furthermore, from the standpoint of the fluidity of the thermoplastic elastomer composition that is obtained, the MFR of the peroxide-crosslinkable olefin resin (c) is preferably 10 to 50 g/10 minutes at 190° C., 21.2 N, more preferably 20 to 50 g/10 minutes.

It is necessary that the amount of the peroxide-crosslinkable olefin resin (c) that is mixed with the composition is 2.5 to 50 mass parts per 100 mass parts of the total of the hydrogenated block copolymer ($a_1$) and non-hydrogenated block copolymer ($a_2$), and it is desirable that this amount is 5 to 45 mass parts. If the mixture amount of the peroxide-crosslinkable olefin resin (c) is less than 2.5 mass-parts, the rubber elasticity of the thermoplastic elastomer composition at high temperatures is insufficient, and the compression set is increased; on the other hand, if this amount exceeds 50 mass parts, the hardness of the thermoplastic elastomer composition becomes excessively high, so that pliability is lost, and bleed-out of the non-aromatic rubber softening agent (b) becomes conspicuous.

The peroxide-decomposable olefin resin (d) used in the present invention refers to an olefin resin which shows a decrease in molecular weight and an increase in fluidity as a result of being thermally decomposed when heat-treated in the presence of a peroxide. Examples of such peroxide-decomposable olefin resin (d) include isotactic polypropylene, and copolymer of propylene with small amounts or other α-olefins such as ethylene, 1-butene, 1-hexene, 1-octene and the like. One or more of these resins may be used. Among these resins, copolymer of propylene with small amounts of α-olefins is desirable for use from the standpoint of favorable rubber elasticity of the thermoplastic elastomer composition, and resins called block type resins are especially desirable for use.

It is necessary that the amount of the peroxide-decomposable olefin resin (d) that is mixed with the composition is 0.5 to 10 times (by mass) the mixture amount of the peroxide-crosslinkable olefin resin (c), and it is desirable that this amount is 0.8 to 8 times (by mass), and more desirably 1 to 6 times the mixture amount. Especially in cases where only a hydrogenated block copolymer ($a_1$) is used as the block copolymer, and a non-hydrogenated block copolymer ($a_2$) is not used, it is desirable that the mixture amount of the peroxide-decomposable olefin resin (d) is 0.8 to 8 times (by mass) the mixture amount of the peroxide-crosslinkable olefin resin (c), and it is even more desirable that the mixture amount of the peroxide-decomposable olefin resin (d) is 1 to 5 times (by mass) the mixture amount of the peroxide-crosslinkable olefin resin (c).

If the mixture amount of the peroxide-decomposable olefin resin (d) is less than that 0.5 times (by mass) the mixture amount of the peroxide-crosslinkable olefin resin (c), the surface smoothness of molded articles, especially injection-molded articles, obtained from the thermoplastic elastomer composition will be lost. On the other hand, if this amount exceeds 10 times (by mass) the mixture amount of the peroxide-crosslinkable olefin resin (c), the rubber elasticity of the thermoplastic elastomer composition at high temperatures will be lost, and the compression set will be increased.

In the present invention, an organic peroxide (e) is used together with the above-mentioned components. Any organic peroxide that has a crosslinking action under dynamic conditions may be used as the organic peroxide (e); either aromatic peroxides or aliphatic peroxides may be used. Furthermore, a single organic peroxide may be used, or two or more organic peroxides may be used. Concrete examples of organic peroxide (e) that can be used in the present invention include 2,5-dimethyl-2,5-di(t-butylperoxy)hexane, 2,5-dimethyl-2,5-di(t-butylperoxy) hexyne-3, 2,5-dimethyl-2,5-di(benzyolperoxy)hexane, t-butyl peroxybenzoate, dicumyl peroxide, diisopropyl benzohydroperoxide, 1,3-bis(t-butylperoxyisopropyl)benzene, benzoyl peroxide and the like. One or more of these peroxides may be used.

There are no restrictions in the strict sense on the amount of organic peroxide (e) that is used; however, it is desirable that the amount used is 0.3 to 1.5 mass parts per 100 mass parts of the total of the above-mentioned components ($a_1$), ($a_2$), (b), (c) and (d), and it is even more desirable that this amount is 0.5 to 1.0 mass parts per 100 mass parts of the above-mentioned total. If the amount of the organic peroxide (e) that is used is less than 0.3 mass parts, the rubber elasticity of the thermoplastic elastomer composition at high temperatures is insufficient, and the compression set tends to increase. On the other hand, if this amount exceeds 1.5 mass parts, the fluidity of the thermoplastic elastomer composition drops, and the drop in molding process-ability and the roughness of the surfaces of molded articles that are obtained tend to become conspicuous.

In the present invention, a crosslinking aid (f) is also used. Multi-functional monomers are desirable for use as such crosslinking aid (f); concrete examples of such assistant include vinyl multi-functional monomers such as triallyl isocyanurate, divinylbenzene and the like; and acrylic multi-functional monomers such as ethylene glycol dimethacrylate, diethylene glycol dimethacrylate, triethylene glycol dimethacrylate and the like.

There are no particular restrictions on the amount of the crosslinking aid (f) that is mixed with the omposition; generally, however, it is desirable that this amount is 0.5 to 3.0 mass parts per mass part of the organic peroxide (e).

In the present invention, an inorganic filler can be mixed with the composition if necessary. Some of the physical properties of molded articles obtained from the thermoplastic elastomer composition of the present invention, such as the compression set and the like, can be improved by mixing an inorganic filler with the compositon; furthermore, a reduction in cost can be obtained by increasing the amount of the composition using the filler. Examples or inorganic filler that can be used include calcium carbonate, talc, magnesium hydroxide, mica, clay, barium sulfate, natural silicic acid, synthetic silicic acid, titanium oxide, carbon black and the like. One or more of these fillers may be used.

Furthermore, in the present invention, reinforcing resins such as poly-α-methylstyrene and the like, flame retarding agents, oxidation inhibitors, heat resistance stabilizing agents, ultraviolet absorbing agents, photo-stabilizers, anti-static agents, mold release agents, foaming agents, pigments, dyes, whiteners and the like may also be mixed with the composition.

The dynamically crosslinked thermoplastic elastomer composition of the present invention can be manufactured very simply by kneading a mixture containing the above-mentioned components ($a_1$), ($a_2$), (b) through (f) and in some cases other components at one time in a heated and melted state in a single-stage step.

Furthermore, in cases where the non-hydrogenated block copolymer ($a_2$) is used together with the hydrogenated block copolymer ($a_1$) as a block polymer, a method in which some portions of the components ($a_1$), ($a_2$) and (b) through (d) are kneaded in a heated and melted state in the presence of the components (e) and (f), after which the remaining portions of the components ($a_1$), ($a_2$) and (b) through (d) are added and kneaded, or a method in which all of the components ($a_1$), ($a_2$) and (b) through (d) are kneaded in a heated and melted state, after which the components (e) and (f) are added and kneaded, may be used. From the standpoint of simplicity of operation, the above-mentioned method in which all of the components are kneaded at one time in a heated and melted state in a single-stage-step is desirable for use.

Here, the term "dynamic crosslinking" used in the present specification refers to a process in which a mixture containing the above-mentioned components ($a_1$), ($a_2$), (b) through (f) and in some cases other components is crosslinked while a shear force is applied from the outside by being kneaded in a heated and melted state.

It is desirable that the kneading temperature used to obtain the dynamically crosslinked thermoplastic elastomer composition of the present invention is selected from the range of 150 to 250° C. In the cases where the composition is manufactured at one time in a single-stage step, it is desirable from the standpoint of favorable physical properties and molding process-ability of the thermoplastic elastomer composition obtained that the first half of the kneading process is performed at a temperature which is such that the half-life of the organic peroxide (e) is equal to ½ or more of the total kneading time, and that the second half of the kneading process is performed at a temperature which is such that the half-life of the organic peroxide (e) is less than ½ of the total kneading time. If kneading is performed in the first half of the kneading process at a temperature which is such that the half-life of the organic peroxide (e) is less than ½ of the total kneading time, a crosslinking reaction will proceed before the hydrogenated block copolymer ($a_1$), non-hydrogenated block copolymer ($a_2$) and peroxide-crosslinkable olefin resin (c) are finely dispersed in the composition, so that the thermoplastic elastomer composition obtained tends to show a drop in physical properties and molding process-ability. Furthermore, the term "first half of the kneading step" as used in the present specification generally refers to the time extending from the initiation of kneading to a point in time that is approximately half-way through the total kneading time. The kneading process after this is referred to as the "second half of the kneading step".

The kneading at one time in a heated and melted state that is used to obtain the dynamically crosslinked thermoplastic elastomer composition of the present invention may be accomplished using any method that has been used in the past in the melt-kneading of thermoplastic polymers; for example, this kneading may be performed using melt-kneading machines such as a single-screw extruder, twin-screw extruder, Banbury mixer, brabender, heating rolls, various types of kneaders or the like.

The thermoplastic elastomer composition of the present invention can be molded using conventional universally known methods such as injection molding, extrusion molding, press molding, calender molding, blow molding or the like.

Molded articles that are superior in terms of pliability, mechanical strength and rubber elasticity can be obtained from the thermoplastic elastomer composition of the present invention. For example, the thermoplastic elastomer composition of the present invention can be effectively used in a broad range of applications, e. g., sheets, films, plate-formed bodies, tubes, hoses, belts and the like; footwear such as sports shoes, fashion sandals and the like; household appliances such as televisions, stereos, vacuum cleaners, refrigerators and the like; sealing packing materials used in doors or window frames of structures; automotive interior and exterior parts such as bumper parts, body panels, weather strips and the like; and various types of grips in scissors, drivers, toothbrushes, ski stocks, pens and the like.

EXAMPLES

The present invention will be concretely described in terms of examples below. However, the present invention is not limited in any way by the following examples.

In the following examples, the various physical properties (hardness, tensile strength, tensile elongation, compression set, oil resistance and surface conditions) of molded articles obtained from the thermoplastic elastomer composition were measured or evaluated by the methods described below.

(1) Hardness

The "type A hardness" was measured according to JIS K-6253.

(2) Tensile Strength and Tensile Elongation

Dumbell-form No.5 test pieces were punched from injection-molded sheets obtained in the examples. The strength and elongation at the time of breaking were measured by performing a tension test according to JIS K-6251, and the values obtained were taken as the tensile strength and tensile elongation.

(3) Compression Set

Injection-molded sheets obtained in the following examples were punched out in a circular shape with a diameter of 29 mm, and six of these punched-out sheets were superimposed and pressed at a temperature of 200° C. and a pressure of 2.19 MPa to produce test pieces. These test pieces were compressed for 22 hours at a compression rate of 25% at temperature of 100° C. and 120° C. according to JIS K-6262. After 22 hours, the compression was released, and the compression set at this time was measured.

(4) Oil Resistance

Test pieces with a size of length×width×thickness=40 mm×20 mm×2 mm were punched out from injection-molded sheets obtained in the following examples, and a 24-hour oil resistance test was performed at a temperature of 100° C. using swelling oil #2 according to JIS K-6258. The rate of increase in the mass following the oil resistance test relative to the mass before the oil resistance test was determined, and this was taken as the mass swelling rate.

(5) Surface Conditions of Molded Articles

The surfaces of injection-molded sheets obtained in the following examples were observed by visual inspection. Samples that showed a smooth surface with no roughness were evaluated as good "G", and samples that showed roughness were evaluated unsatisfactory "NG".

Furthermore, the contents and symbols of the respective compounds used in the following examples were as follows:

(1) Hydrogenated block copolymer ($a_1$):

Block copolymers were synthesized by the successive anionic polymerization of styrene, and mixture of isoprene and 1,3-butadiene in cyclohexane using s-butyllithium as a polymerization initiator. The block copolymers thus obtained were subjected to a hydrogenation reaction for 5 hours at 75° C. in a pressurized hydrogen atmosphere at 0.8 MPa using a Ziegler catalyst in cyclohexane, thus producing the hydrogenated block copolymers shown in Table 1 below.

TABLE 1

| [Types of Hydrogenated Block Copolymers ($a_1$)] | | |
|---|---|---|
| Styrene content (mass %) | Number average molecular weight | Isoprene/butadiene (mass ratio) |
| ($a_1$)-1 | 30 | $26 \times 10^4$ | 50/50 |
| ($a_1$)-2 | 30 | $26 \times 10^4$ | 50/50 |
| ($a_1$)-3 | 30 | $34 \times 10^4$ | 50/50 |
| ($a_1$)-4 | 30 | $10 \times 10^4$ | 50/50 |

(2) Non-hydrogenated block copolymer ($a_2$):
"KRATON D1101" manufactured by KRATON Polymer Co. (polystyrene-polybutadiene-polystyrene tri-block copolymer; number average molecular weight=130,000, styrene unit content=31 mass %)

(3) Non-aromatic rubber softening agent (b):

(b)-1:
"Dyanaprocess PW-380" manufactured by Idemitsu Kosan Co., Ltd. (paraffin type process oil; kinematic viscosity=381.6 mm$^2$/s (40° C.), pour point=−15° C., ring analysis: CN=27.0%, CP=73.0%)

(b)-2:
"Dyanaprocess PW-90" manufactured by Idemitsu Kosan Co., Ltd. (paraffin type process oil; kinematic viscosity=95.54 mm$^2$/s (40° C.), pour point=−15° C., ring analysis: CN=29.0%, CP=71.0%)

(4) Peroxide-crosslinkable olefin resin (c):

(c)-1:
"Novatek HJ490" manufactured by Japan Polychem Corporation (high density polyethylene resin; MFR=20 g/10 minutes (190° C., 21.2 N), density=0.958 g/cm$^3$)

(c)-2:
"Novatek LJ800" manufactured by Japan Polychem Corporation (low density polyethylene resin; MFR=20 g/10 minutes (190° C., 21.2 N), density=0.918 g/cm$^3$)

(5) Peroxide-decomposable olefin resin (d):

(d)-1:
"Grandpolypro J704" manufactured by Grand Polymer Co., Ltd. (block type polypropylene resin; MFR=5 g/10 minutes (230° C., 21.2 N), density=0.90 g/cm$^3$)

(d)-2:
"Grandpolypro B701" manufactured by Grand Polymer Co., Ltd. (block type polypropylene resin; MFR=0.5 g/10 minutes (230° C., 21.2 N), density=0.90 g/cm$^3$)

(6) Organic peroxide (e):
"Perhexa 25B-40" manufactured by NOF Corporation (2,5-dimethyl-2,5-di(t-butylperoxy)hexane, product containing 40 mass %, carrier: silica)

(7) Crosslinking aid (f):
"TAIC M-60" manufactured by Nippon Kasei Chemical Co., Ltd. (triallyl isocyanurate, product containing 60 mass %, carrier: diatomaceous earth)

Examples 1 Through 6

(1) A hydrogenated block copolymer ($a_1$), a non-hydrogenated block copolymer ($a_2$), a non-aromatic rubber softening agent (b), a peroxide-crosslinkable olefin resin (c), a peroxide-decomposable olefin resin (d), an organic peroxide (e) and a crosslinking aid (f) of the respective types shown in Table 2 below were pre-mixed in the amounts shown in Table 2 below. This mixture was supplied at one time to a twin-screw extruder ("TEM-35B" manufactured by Toshiba Machine Co., Ltd.), and was melted and kneaded at a screw rotation of 200 rpm at the temperature shown in Table 2 below.

Afterward, the mixture was extruded in strand form, and was then cut to produce pellets of a dynamically crosslinked thermoplastic elastomer composition.

(2) Using the pellets obtained in the above-mentioned (1), injection molding was performed at a melt temperature of 230° C. and a mold temperature of 40° C. using an injection molding machine ("IS-55EPN" manufactured by Toshiba Machine Co., Ltd., mold closing pressure 55×10³ kg), thus producing sheet-formed molded articles in which length×width×thickness=110 mm×110 mm×2 mm. When hardness, tensile strength, tensile elongation, compression set, oil resistance and surface condition were evaluated for these molded articles by the above-mentioned methods, the results obtained were as shown in Table 2 below.

Comparative Examples 1 Through 4

(1) The components shown in Table 3 below were pre-mixed in the amounts shown in Table 3 below, and the resulting mixture was supplied to the same twin-screw extruder as that used in (1) of Example 1, and was melted and kneaded at a screw rotation of 200 rpm at the temperature shown in Table 3. Afterward, the mixture was extruded in strand form, and was then cut to produce pellets of a dynamically crosslinked thermoplastic elastomer composition.

(2) Using the pellets obtained in the above-mentioned (1), injection molding was performed in the same manner as in (2) of Example 1, thus producing sheet-form molded articles in which length×width×thickness=110 mm×110 mm×2 mm. When hardness, tensile strength, tensile elongation, compression set, oil resistance and surface conditions were measured or evaluated for these molded articles by the above-mentioned methods, the results obtained were as shown in Table 3 below.

Comparative Examples 5 and 6

(1) The components shown in Table 3 below were pre-mixed in the amounts shown in Table 3 below, and the resulting mixture was supplied to the same twin-screw extruder as that used in (1) of Example 1, and was melted and kneaded at a screw rotation of 200 rpm at the temperature shown in Table 3. Afterward, the mixture was extruded in strand form, and was then cut to produce pellets of a dynamically crosslinked thermoplastic elastomer composition.

(2) Using the pellets obtained in the above-mentioned (1), injection molding was performed in the same manner as in (2) of Example 1, thus producing sheet-form molded articles in which length×width×thickness=110 mm×110 mm×2 mm. When hardness, tensile strength, tensile elongation, compression set, oil resistance and surface conditions were evaluated for these molded articles by the above-mentioned methods, the results obtained were as shown in Table 3 below.

Furthermore, in Comparative Example 6, the roughness of the surface of the molded article was conspicuous, and the quality was poor; accordingly, the respective physical properties were not measured or evaluated.

TABLE 2

| | Example | | | | | |
|---|---|---|---|---|---|---|
| | 1 | 2 | 3 | 4 | 5 | 6 |
| [Composition (mass parts)] | | | | | | |
| Hydrogenated block copolymer (a): | | | | | | |
| $(a_1)$-1 (Mn = 260,000) | 90 | 90 | 85 | | 90 | 90 |
| $(a_1)$-2 (Mn = 200,000) | | | | 90 | | |
| $(a_1)$-4 (Mn = 100,000) | | | | | | |
| Non-hydrogenated block copolymer $(a_2)$ | 10 | 10 | 15 | 10 | 10 | 10 |
| Non-aromatic rubber softening agent (b)-1 | 100 | 200 | 100 | 100 | 130 | 80 |
| Peroxide-crosslinkable olefin resin (c): | | | | | | |
| (c)-1 (density = 0.958 g/cm³) | 5 | 5 | 5 | 5 | 10 | 30 |
| (c)-2 (density = 0.918 g/cm³) | | | | | | |
| Peroxide-decomposable olefin resin (d): | | | | | | |
| (d)-1 | 25 | 20 | 25 | | 30 | 35 |
| (d)-2 | | | | 25 | | |
| Organic peroxide (e) | 1.15 | 2.93 | 1.15 | 1.15 | 1.62 | 1.23 |
| (per 100 mass parts of above-mentioned $(a_1)$ through (d)) | (0.5) | (0.9) | (0.5) | (0.5) | (0.6) | (0.5) |
| Crosslinking aid (f) | 1.15 | 4.23 | 1.15 | 1.15 | 2.43 | 1.23 |
| (per 100 mass parts of above-mentioned $(a_1)$ through (d)) | (0.5) | (1.3) | (0.5) | (0.5) | (0.9) | (0.5) |
| [Kneading temperature] | | | | | | |
| First half of kneading (° C.) | 170 | 170 | 170 | 170 | 170 | 170 |
| Second half of kneading (° C.) | 200 | 200 | 200 | 200 | 200 | 200 |
| [Physical properties (molded articles)] | | | | | | |
| Hardness (type A) | 50 | 31 | 50 | 50 | 57 | 78 |
| Tensile strength (MPa) | 8.6 | 3.6 | 8.5 | 8.4 | 6.8 | 9.7 |
| Tensile elongation (%) | 800 | 680 | 800 | 810 | 700 | 700 |

TABLE 2-continued

|  | Example | | | | | |
|---|---|---|---|---|---|---|
|  | 1 | 2 | 3 | 4 | 5 | 6 |
| Compression set | | | | | | |
| After 22 hours at 100° C. (%) | 31 | 30 | 31 | 33 | 32 | 38 |
| After 22 hours at 120° C. (%) | 36 | 35 | 36 | 39 | 35 | 48 |
| Oil resistance (%) | 51 | 56 | 53 | 51 | 43 | 33 |
| Surface conditions of molded Articles | G | G | G | G | G | G |

TABLE 3

|  | Comparative Example | | | | | |
|---|---|---|---|---|---|---|
|  | 1 | 2 | 3 | 4 | 5 | 6 |
| [Composition (mass parts)] Hydrogenated block copolymer (a): | | | | | | |
| $(a_1)$-1 (Mn = 260,000) |  | 75 | 90 | 90 | 90 | 90 |
| $(a_1)$-2 (Mn = 200,000) | | | | | | |
| $(a_1)$-4 (Mn = 100,000) | 90 | | | | | |
| Non-hydrogenated block copolymer $(a_2)$ | 10 | 25 | 10 | 10 | 10 | 10 |
| Non-aromatic rubber softening agent (b)-1 | 100 | 100 | 300 | 130 | 130 | 130 |
| Peroxide-crosslinkable olefin resin (c): | | | | | | |
| (c)-1 (density = 0.958 g/cm³) | 5 | 5 | 10 |  |  | 40 |
| (c)-2 (density = 0.918 g/cm³) |  |  |  |  | 15 |  |
| Peroxide-decomposable olefin resin (d): | | | | | | |
| (d)-1 | 25 | 25 | 50 | 45 | 30 | 5 |
| (d)-2 | | | | | | |
| Organic peroxide (e) (per 100 mass parts of above-mentioned $(a_1)$ through (d)) | 1.15 (0.5) | 1.15 (0.5) | 2.30 (0.5) | 1.38 (0.5) | 1.10 (0.4) | 1.10 (0.4) |
| Crosslinking aid (f) (per 100 mass parts of above-mentioned $(a_1)$ through (d)) | 1.15 (0.5) | 1.15 (0.5) | 2.30 (0.5) | 1.38 (0.5) | 0.83 (0.3) | 0.83 (0.3) |
| [Kneading temperature] | | | | | | |
| First half of kneading (° C.) | 170 | 170 | 170 | 170 | 170 | 170 |
| Second half of kneading (° C.) | 200 | 200 | 200 | 200 | 200 | 200 |
| [Physical properties (molded articles)] | | | | | | |
| Hardness (type A) | 52 | 49 | Bleeding conspicuous | 59 | 60 | Not measured |
| Tensile strength (MPa) | 10.9 | 7.8 | | 8.9 | 8.2 | |
| Tensile elongation (%) | 900 | 660 | | 880 | 800 | |
| Compression set | | | | | | |
| After 22 hours at 100° C. (%) | 88 | 32 |  | 51 | 46 | |
| After 22 hours at 120° C. (%) | 94 | Yellow conspicuous |  | 65 | 59 | |
| Oil resistance (%) | 49 | 59 | | 46 | 95 | |
| Surface conditions of molded articles | G | G | | G | G | NG |

As is clear from the results shown in the above-mentioned Table 2, in Examples 1 through 6, since thermoplastic elastomer compositions were manufactured by a process in which a mixture which contained a hydrogenated block copolymer $(a_1)$-1 or $(a_1)$-2 with a number average molecular weight of 200,000 or above and a non-hydrogenated block copolymer $(a_2)$ in the range of [$(a_1)$-1 or $(a_1)$-2]:$(a_2)$=85:15 to 100:0 (mass ratio), which contained a non-aromatic rubber softening agent (b) in the range of 50 to 250 mass parts per 100 mass parts of the total of the hydrogenated block copolymer $(a_1)$-1 or $(a_1)$-2 and the non-hydrogenated block copolymer $(a_2)$, and a peroxide-crosslinkable olefin resin (c) with a density of 0.94 g/cm³ or above in the range of 2.5 to 50 mass parts per 100 mass parts of the total of the hydrogenated block copolymer $(a_1)$-1 or $(a_1)$-2 and the non-hydrogenated block copolymer $(a_2)$, which contained a peroxide-decomposable olefin resin (d) in the range of 0.5 to 10 times (by mass) the mixture amount of the peroxide-crosslinkable olefin resin (c), and which further contained an organic peroxide (e) and a crosslinking aid (f), the molded articles obtained from these thermoplastic elastomer compositions were superior in terms of pliability and superior in terms of rubber elasticity, especially rubber elasticity at high temperatures; furthermore, these molded articles showed an extremely small compression set, and were superior in terms of mechanical strength and oil resistance, and superior in terms of surface characteristics, with no surface roughness or bleed-out.

In Comparative Example 1, on the other hand, as is clear from the results shown in Table 3, since a hydrogenated block copolymer $(a_1)$-4 with a number average molecular weight of less than 200,000 was used as the hydrogenated-block copolymer $(a_1)$, the molded article consisting of the thermoplastic elastomer composition obtained in Comparative Example 1 showed an extremely large compression set at high temperature, and was conspicuously inferior in terms of rubber elasticity at high temperatures.

Furthermore, in the case of Comparative Example 2, since the mixture amount of the non-hydrogenated block copolymer $(a_2)$ exceed the mixture amount stipulated in the present invention, the molded article consisting of the thermoplastic elastomer composition obtained in Comparative Example 2 showed conspicuous yellowing at high temperatures (120° C.), and was inferior in terms of heat resistance; furthermore, this molded article was inferior in terms of oil resistance, showing a large degree of swelling caused by oil.

In the case of Comparative Example 3, since the mixture amount of the non-aromatic rubber softening agent (b) exceeded the mixture amount stipulated in the present invention, the molded article consisting of the thermoplastic elastomer composition obtained in Comparative Example 3 showed conspicuous bleed-out of the rubber softening agent.

In the case of Comparative Example 4, since the mixture that did not contain a peroxide-crosslinkable olefin resin (c) was used, the molded article consisting of the thermoplastic elastomer composition obtained in Comparative Example 4 showed a large compression set at high temperatures, and was inferior in terms of rubber elasticity at high temperatures.

Furthermore, in the case of Comparative Example 5, as is clear from the results shown in Table 3, since a peroxide-crosslinkable olefin resin (c)-2 with a density of less than 0.94 g/cm³ was used as the peroxide-crosslinkable olefin resin (c), the molded article consisting of the thermoplastic elastomer composition obtained in Comparative Example 5 showed a large compression set at high temperatures, and was inferior in terms of rubber elasticity at high temperatures; furthermore, this molded article was inferior in terms of oil resistance, showing a large degree of swelling caused by oil.

In the case of Comparative Example 6, since the mixture amount of the peroxide-decomposable olefin resin (d) was smaller than the mixture amount stipulated in the present invention, the molded article consisting of the thermoplastic elastomer composition obtained in Comparative Example 6 showed conspicuous surface roughness.

Examples 7 Through 12

(1) The above-mentioned hydrogenated block copolymer $(a_1)$, non-aromatic type rubber softening agent (b), peroxide-crosslinkable olefin resin (c), peroxide-decomposable olefin resin (d), organic peroxide (e) and crosslinking aid (f) were pre-mixed in the amounts shown in Table 4 below. This mixture was supplied at one time to a twin-screw extruder ("TEM-35B" manufactured by Toshiba Machine Co., Ltd.), and was melted and kneaded at a screw rotation of 200 rpm at the temperature shown in Table 4 below. Afterward, the mixture was extruded in strand form, and was then cut to produce pellets of a dynamically crosslinked thermoplastic elastomer composition.

(2) Using the pellets obtained in the above-mentioned (1), injection molding was performed at a melt temperature of 230° C. and a mold temperature of 40° C. using an injection molding machine ("IS-55EPN" manufactured by Toshiba Machine Co., Ltd., mold closing pressure 55×10³ kg), thus producing sheet-formed molded articles in which length×width×thickness=110 mm×110 mm×2 mm. When hardness, tensile strength, tensile elongation, compression set, oil resistance and surface condition were measured or evaluated for these molded articles by the above-mentioned methods, the results obtained were as shown in Table 4 below.

Comparative Examples 7 Through 11

(1) The above-mentioned hydrogenated block copolymer $(a_1)$, non-aromatic type rubber softening agent (b), peroxide-crosslinkable olefin resin (c), peroxide-decomposable olefin resin (d), organic peroxide (e) and crosslinking aid (f) were pre-mixed in the amounts shown in Table 5 below. This mixture was supplied at one time to a twin-screw extruder ("TEM-35B" manufactured by Toshiba Machine Co., Ltd.), and was melted and kneaded at a screw rotation of 200 rpm at the temperature shown in Table 5 below. Afterward, the mixture was extruded in strand form, and was then cut to produce pellets of a dynamically crosslinked thermoplastic elastomer composition.

(2) Using the pellets obtained in the above-mentioned (1), injection molding was performed at a melt temperature of 230° C. and a mold temperature of 40° C. using an injection molding machine ("IS-55EPN" manufactured by Toshiba Machine Co., Ltd., mold closing pressure 55×10³ kg), thus producing sheet-form molded articles in which length×width×thickness=110 mm×110 mm×2 mm. When hardness, tensile strength, tensile elongation, compression set, oil resistance and surface condition were evaluated for these molded articles by the above-mentioned methods, the results obtained were as shown in Table 5 below.

Furthermore, in the case of Comparative Example 8, the bleed-out of the non-aromatic type rubber softening agent (b) in the molded article was conspicuous, and in the case of Comparative Example 11, the surface roughness of the molded article was conspicuous, so that the quality of both of these molded articles was poor. Accordingly, the hardness, tensile strength, tensile elongation, compression set and oil resistance were not tested.

TABLE 4

|  | Example | | | | | |
|---|---|---|---|---|---|---|
|  | 7 | 8 | 9 | 10 | 11 | 12 |
| [Composition (mass parts)] Hydrogenated block copolymer ($a_1$): | | | | | | |
| ($a_1$)-1 (Mn = 260,000) | 100 | 100 | | 100 | 100 | |
| ($a_1$)-2 (Mn = 200,000) | | | 100 | | | |
| ($a_1$)-3 (Mn = 340,000) | | | | | | 100 |
| ($a_1$)-4 (Mn = 100,000) | | | | | | |
| Non-aromatic rubber softening agent (b): | | | | | | |
| (b)-1 | 100 | 200 | 100 | 130 | 80 | |
| (b)-2 | | | | | | 200 |
| Peroxide-crosslinkable olefin resin (c): | | | | | | |
| (c)-1 (density = 0.958 g/cm$^3$) | 5 | 5 | 10 | 10 | 30 | 5 |
| (c)-2 (density = 0.918 g/cm$^3$) | | | | | | |
| Peroxide-decomposable olefin resin (d): | | | | | | |
| (d)-1 | 25 | 20 | | 30 | 35 | 20 |
| (d)-2 | | | 20 | | | |
| Organic peroxide (e) (per 100 mass parts of above-mentioned ($a_1$) through (d)) | 1.15 (0.5) | 2.93 (0.9) | 1.15 (0.5) | 1.62 (0.6) | 1.23 (0.5) | 2.93 (0.9) |
| Crosslinking aid (f) (per 100 mass parts of above-mentioned ($a_1$) through (d)) | 1.15 (0.5) | 4.23 (1.3) | 1.15 (0.5) | 2.43 (0.9) | 1.23 (0.5) | 4.23 (1.3) |
| [Kneading temperature] | | | | | | |
| First half of kneading (° C.) | 165 | 165 | 165 | 165 | 165 | 165 |
| Second half of kneading (° C.) | 200 | 200 | 200 | 200 | 200 | 200 |
| [Physical properties (molded articles)] | | | | | | |
| Hardness (type A) | 50 | 31 | 50 | 57 | 78 | 30 |
| Tensile strength (MPa) | 8.3 | 3.5 | 8.1 | 6.6 | 9.4 | 3.3 |
| Tensile elongation (%) | 770 | 650 | 780 | 670 | 680 | 650 |
| Compression set | | | | | | |
| After 22 hours at 100° C. (%) | 35 | 35 | 36 | 36 | 43 | 35 |
| After 22 hours at 120° C. (%) | 40 | 39 | 42 | 40 | 50 | 38 |
| Oil resistance (%) | 50 | 57 | 52 | 42 | 34 | 53 |
| Surface conditions of molded articles | G | G | G | G | G | G |

TABLE 5

|  | Comparative Example | | | | |
|---|---|---|---|---|---|
|  | 7 | 8 | 9 | 10 | 11 |
| [Composition (mass parts)] Hydrogenated block copolymer ($a_1$): | | | | | |
| ($a_1$)-1 (Mn = 260,000) | | 100 | 100 | 100 | 100 |
| ($a_1$)-2 (Mn = 200,000) | | | | | |
| ($a_1$)-3 (Mn = 340,000) | | | | | |
| ($a_1$)-4 (Mn = 100,000) | 100 | | | | |
| Non-aromatic rubber softening agent (b): | | | | | |
| (b)-1 | 100 | 300 | 130 | 130 | 130 |
| (b)-2 | | | | | |
| peroxide-crosslinkable olefin resin (c): | | | | | |
| (c)-1 (density = 0.958 g/cm$^3$) | 5 | 10 | | | 40 |
| (c)-2 (density = 0.918 g/cm$^3$) | | | | 15 | |

TABLE 5-continued

|  | Comparative Example | | | | |
|---|---|---|---|---|---|
|  | 7 | 8 | 9 | 10 | 11 |
| Peroxide-decomposable olefin resin (d): | | | | | |
| (d)-1 | 25 | 50 | 45 | 30 | 5 |
| (d)-2 | | | | | |
| Organic peroxide (e) | 1.15 | 2.30 | 1.38 | 1.10 | 1.10 |
| (per 100 mass parts of above-mentioned ($a_1$) through (d)) | (0.5) | (0.5) | (0.5) | (0.4) | (0.4) |
| Crosslinking aid (f) | 1.15 | 2.30 | 1.38 | 0.83 | 0.83 |
| (per 100 mass parts of above-mentioned ($a_1$) through (d)) | (0.5) | (0.5) | (0.5) | (0.3) | (0.3) |
| [Kneading temperature] | | | | | |
| First half of kneading (° C.) | 165 | 165 | 165 | 165 | 165 |
| Second half of kneading (° C.) | 200 | 200 | 200 | 200 | 200 |
| [Physical properties (molded articles)] | | | | | |
| Hardness (type A) | 52 | Bleeding | 59 | 60 | Not |
| Tensile strength (MPa) | 10.6 | conspicuous | 8.6 | 8.0 | measured |
| Tensile elongation (%) | 860 | | 880 | 770 | |
| Compression set | | | | | |
| After 22 hours at 100° C. (%) | 91 | | 53 | 49 | |
| After 22 hours at 120° C. (%) | 96 | | 67 | 61 | |
| Oil resistance (%) | 50 | | 45 | 94 | |
| Surface conditions of molded articles | G | | G | G | NG |

In the case of Examples 7 through 12, as is clear from the results shown in the above-mentioned Table 4, since one of the hydrogenated block copolymers ($a_1$)-1 through ($a_1$)-3 with a number of average molecular weight of 200,000 or above, the non-aromatic rubber softening agent (b), the peroxide-crosslinkable olefin resin (c)-1 with a density of 0.94 g/cm³ or above, the peroxide-decomposable olefin resin (d), the organic peroxide (e) and the crosslinking aid (f) were used, and since the non-aromatic rubber softening agent (b) was used in the range of 50 to 250 mass parts per 100 mass parts of the hydrogenated block copolymer ($a_1$), the peroxide-crosslinkable olefin resin (c)-1 was used in the range of 2.5 to 50 mass parts per 100 mass parts of the hydrogenated block copolymer ($a_1$), and the mixture amount of the peroxide-decomposable olefin resin (d) was set in the range of 0.5 to 10 times (by mass) the mixture amount of the peroxide-crosslinkable olefin resin (c)-1, the molded articles consisting of the thermoplastic elastomer compositions obtained in Examples 7 through 12 were superior in terms of pliability and superior in terms of rubber elasticity, especially rubber elasticity at high temperatures, and also showed a small compression set, and were superior in terms mechanical strength and oil resistance and superior in terms of surface characteristics, with no surface roughness or bleed-out, in spite of the fact that an extremely simple operation of melting and kneading of all of the components at one time under heating in a single-stage was used.

In the case of Comparative Example 7, on the other hand, as is clear from the results shown in Table 5, since a hydrogenated block copolymer ($a_1$)-4 with a number average molecular weight of less than 200,000 was used as the hydrogenated block copolymer ($a_1$) in the manufacture of the thermoplastic elastomer composition, the molded article consisting of the thermoplastic elastomer composition obtained in Comparative Example 7 showed an extremely large compression set at high temperatures, and was inferior in terms of rubber elasticity at high temperatures.

In the case of Comparative Example 8, since the non-aromatic rubber softening agent (b) was used in an amount exceeding the amount stipulated in the present invention, the molded article consisting of the thermoplastic elastomer composition obtained in Comparative Example 8 showed conspicuous bleed-out of the rubber softening agent.

In the case of Comparative Example 9, since peroxide-crosslinkable olefin resin (c) was not used, the molded article consisting of the thermoplastic elastomer composition obtained in Comparative Example 9 showed a large compression set at high temperatures, and was inferior in terms of rubber elasticity at high temperatures.

In the case of Comparative Example 10, since (c)-2 with a density of less than 0.94 g/cm³ was used as the peroxide-crosslinkable olefin resin (c), the molded article consisting of the thermoplastic elastomer composition obtained in Comparative Example 10 showed a large compression set at high temperatures, and was inferior in terms of rubber elasticity at high temperatures; furthermore, this molded article was inferior in terms of oil resistance, showing a large degree of swelling caused by oil.

In the case of Comparative Example 11, since the amount of the peroxide-decomposable olefin resin (d) that was used was smaller than the amount stipulated in the present invention, the surface roughness of the molded article was conspicuous.

INDUSTRIAL APPLICABILITY

In cases where the present invention is used, a thermoplastic elastomer composition which yields molded articles that are superior in terms of pliability and superior in terms of rubber elasticity, especially rubber elasticity at high temperatures, that show an extremely small compression set even when compressed for a long period of time at high temperatures, that are also superior in terms of characteristics such as high-temperature creep performance, mechanical strength, oil resistance, solvent resistance, heat resistance, weather resistance and the like, and that show a good external appearance with no surface roughness or bleed-out of the softening agent to the surface, can be manufactured with good productivity by an extremely simple operation in which all of the components are melted and kneaded at one time under heating in a single-stage.

For example, the thermoplastic elastomer composition obtained by the present invention can be molded by conventional universally known methods such as injection molding, extrusion molding, press molding, calender molding, blow molding or the like.

As a result of the various superior characteristics described above, the thermoplastic elastomer composition obtained by the present invention can be used in a broad range of applications beginning with industrial products, e.g., sheets, films, plate-formed bodies, tubes, hoses, belts and the like; footwear such as sports shoes, fashion sandals and the like; household appliances such as televisions, stereos, vacuum cleaners, refrigerators and the like; sealing packing used in doors or window frames of structures; automotive interior and exterior parts such as bumper parts, body panels, weather strips and the like; and various types of grips in scissors, drivers, toothbrushes, ski stocks, pens and the like.

The invention claimed is:

1. A process for producing a thermoplastic elastomer composition, comprising, in a single-stage step, melting and kneading a mixture under heating to be dynamically crosslinked, wherein said mixture contains:
   (i) a hydrogenated block copolymer ($a_1$) with a number average molecular weight of 200,000 or above which is obtained by hydrogenating a block copolymer that has at least one polymer block $A_1$ comprising mainly a vinyl aromatic compound and at least one polymer block $B_1$ comprising mainly a conjugate diene compound, and a non-hydrogenated block copolymer ($a_2$) which has at least one polymer block $A_2$ comprising mainly a vinyl aromatic compound and at least one polymer block $B_2$ comprising mainly a conjugate diene compound, at a mass ratio of the hydrogenated block copolymer ($a_1$):the non-hydrogenated block copolymer ($a_2$)=85:15 to 100:0;
   (ii) a non-aromatic rubber softening agent (b) at a ratio of 50 to 250 mass parts per 100 mass parts of the total of the hydrogenated block copolymer ($a_1$) and the non-hydrogenated block copolymer ($a_2$);
   (iii) a peroxide-crosslinkable olefin resin (c) with a density of 0.94 g/cm$^3$ or above at a ratio of 2.5 to 50 mass parts per 100 mass parts of the total of the hydrogenated block copolymer ($a_1$) and non-hydrogenated block copolymer ($a_2$);
   (iv) a peroxide-decomposable olefin resin (d) at the rate of 0.5 to 10 times by mass the mixture amount of the peroxide-crosslinkable olefin resin (c); and
   (v) an organic peroxide (e) and a crosslinking aid (f),
   wherein an injection-molded sheet obtained from said thermoplastic elastomer composition has a compression set when compressed for 22 hours at a compression rate of 25% according to JIS K-6262 at 100° C. of 43 or less, and at 120° C. of 50 or less.

2. The process according to claim 1, wherein the content ratio of the hydrogenated block copolymer ($a_1$):non-hydrogenated block copolymer ($a_2$) is 85:15 to 99:1.

3. The process according to claim 1, wherein the content ratio of the hydrogenated block copolymer ($a_1$):non-hydrogenated block copolymer ($a_2$) is 100:0.

4. The process according to claim 1, wherein the polymer block $B_1$ comprising mainly a conjugate diene compound in the above-mentioned hydrogenated block copolymer ($a_1$) is a polymer block comprising 1,3-butadiene and isoprene.

5. The process according to claim 1, wherein the amount of the organic peroxide (e) that is added is 0.3 to 1.5 mass parts per 100 mass parts of the total of the above-mentioned ($a_1$), ($a_2$), (b), (c) and (d), and the amount of the crosslinking aid (f) that is added is 0.5 to 3.0 times by mass the mixture amount of the organic peroxide (e).

6. The process according to claim 1, wherein the kinematic viscosity ($B_v$) (mm$^2$/s) of the non-aromatic rubber softening agent (b) at 40° C. satisfies the following formula ①:

$$B_v(\text{mm}^2/\text{s}) \geq 3 \times 10^7 / Mna_1 \qquad ①$$

wherein the above formula, $B_v$ indicates the kinematic viscosity of the non-aromatic rubber softening agent (b) at 40° C., and $Mna_1$ indicates the number average molecular weight of the hydrogenated block copolymer ($a_1$).

7. A thermoplastic elastomer composition which is obtained by, in a single-stage step, melting and kneading a mixture under heating to be dynamically crosslinked, wherein said mixture contains:
   (i) a hydrogenated block copolymer ($a_1$) with a number average molecular weight of 200,000 or above which is obtained by hydrogenating a block copolymer that has at least one polymer block $A_1$ comprising mainly a vinyl aromatic compound and at least one polymer block $B_1$ comprising mainly a conjugate diene compound, and a non-hydrogenated block copolymer ($a_2$) which has at least one polymer block $A_2$ comprising mainly a vinyl aromatic compound and at least one polymer block $B_2$ comprising mainly a conjugate diene compound, at a mass ratio of the hydrogenated block copolymer ($a_1$):the non-hydrogenated block copolymer ($a_2$)=85:15 to 100:0;
   (ii) a non-aromatic rubber softening agent (b) at a ratio of 50 to 250 mass parts per 100 mass parts of the total of the hydrogenated block copolymer ($a_1$) and the non-hydrogenated block copolymer ($a_2$);
   (iii) a peroxide-crosslinkable olefin resin (c) with a density of 0.94 g/cm$^3$ or above at a ratio of 2.5 to 50 mass parts per 100 mass parts of the total of the hydrogenated block copolymer ($a_1$) and non-hydrogenated block copolymer ($a_2$);
   (iv) a peroxide-decomposable olefin resin (d) at the rate of 0.5 to 10 times by mass the mixture amount of the peroxide-crosslinkable olefin resin (c); and
   (v) an organic peroxide (e) and a crosslinking aid (f),
   wherein an injection-molded sheet obtained from said thermoplastic elastomer composition has a compression set when compressed for 22 hours at a compression rate of 25% according to JIS K-6262 at 100° C. of 43 or less, and at 120° C. of 50 or less.

8. A thermoplastic elastomer composition, which is obtained by, in an arbitrary step that contains a single stage step, melting and kneading a mixture under heating to be dynamically crosslinked, wherein said mixture contains:
   (i) a hydrogenated block copolymer ($a_1$) with a number average molecular weight of 200,000 or above which is obtained by hydrogenating a block copolymer that has at least one polymer block $A_1$ comprising mainly a vinyl aromatic compound and at least one polymer block $B_1$ comprising mainly a conjugate diene compound, and a non-hydrogenated block copolymer ($a_2$) which has at least one polymer block $A_2$ comprising mainly a vinyl aromatic compound and at least one polymer block $B_2$ comprising mainly a conjugate diene compound, at a mass ratio of the hydrogenated block copolymer ($a_1$):the non-hydrogenated block copolymer ($a_2$)=85:15 to 99:1;

(ii) a non-aromatic rubber softening agent (b) at a ratio of 50 to 250 mass parts per 100 mass parts of the total of the hydrogenated block copolymer (a1) and the non-hydrogenated block copolymer ($a_2$);

(iii) a peroxide-crosslinkable olefin resin (c) with a density of 0.94 g/cm$^3$ or above at a ratio of 2.5 to 50 mass parts per 100 mass parts of the total of the hydrogenated block copolymer ($a_1$) and non-hydrogenated block copolymer ($a_2$);

(iv) a peroxide-decomposable olefin resin (d) at the rate of 0.5 to 10 times by mass the mixture amount of the peroxide-crosslinkable olefin resin (c); and (v) an organic peroxide (e) and a crosslinking aid (f), wherein an injection-molded sheet obtained from said thermoplastic elastomer composition has a compression set when compressed for 22 hours at a compression rate of 25% according to JIS K-6262 at 100° C. of 43 or less, and at 120° C. of 50 or less.

* * * * *